US008688559B2

(12) United States Patent  
Calman et al.

(10) Patent No.: US 8,688,559 B2
(45) Date of Patent: Apr. 1, 2014

(54) PRESENTING INVESTMENT-RELATED INFORMATION ON A MOBILE COMMUNICATION DEVICE

(75) Inventors: Matthew A. Calman, Charlotte, NC (US); Erik Stephen Ross, Charlotte, NC (US); Alfred Hamilton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/342,047

(22) Filed: Jan. 1, 2012

(65) Prior Publication Data

US 2012/0233089 A1 Sep. 13, 2012

Related U.S. Application Data

(60) Provisional application No. 61/450,213, filed on Mar. 8, 2011, provisional application No. 61/478,405, filed on Apr. 22, 2011.

(51) Int. Cl.
*G06Q 40/00* (2012.01)

(52) U.S. Cl.
USPC ............... 705/36 R; 705/35; 705/44; 705/14; 713/201

(58) Field of Classification Search
USPC ................. 705/36 R, 35, 44, 14; 713/201
See application file for complete search history.

(56) References Cited

U.S. PATENT DOCUMENTS

| 7,016,532 | B2 | 3/2006 | Boncyk et al. |
| 7,155,228 | B2 | 12/2006 | Rappaport et al. |
| 7,403,652 | B2 | 7/2008 | Boncyk et al. |
| 7,412,081 | B2 | 8/2008 | Doi |
| 7,424,303 | B2 | 9/2008 | Al-Sarawi |
| 7,477,780 | B2 | 1/2009 | Boncyk et al. |
| 7,526,280 | B2 | 4/2009 | Jung et al. |
| 7,564,469 | B2 | 7/2009 | Cohen |
| 7,565,008 | B2 | 7/2009 | Boncyk et al. |

(Continued)

OTHER PUBLICATIONS

International Searching Authority, PCT International Search Report and Written Opinion dated May 28, 2012. PCT International Application No. PCT/US12/28036. Name of Applicant: Bank of America Corporation. English Language. 11 pages.

(Continued)

*Primary Examiner* — Charles Kyle
*Assistant Examiner* — Siegfried E Chencinski
(74) *Attorney, Agent, or Firm* — Michael A. Springs; Moore & Van Allen, PLLC; James C. Edwards

(57) ABSTRACT

Methods, systems, computer programs are described that provide for presenting investment-related information in conjunction with display of a live video stream that includes the related publicly traded or privately held business entity or an object associated with the business entity. Business entities or the objects associated with the business entities that are proximate to a mobile communication device may be identified via object recognition techniques, product codes, wireless communication, location determination or the like. Once the business entities or objects have been identified, the related investment information is retrieved and indicators are displayed in the live video stream proximate to the display of the business entity or an object associated with the business entity. The user can activate the indicator to receive further investment-related information or be connected to an online investment broker for the purpose of purchase stock or some other form of investment instrument associated with the business entity.

42 Claims, 6 Drawing Sheets

(56) References Cited

U.S. PATENT DOCUMENTS

| | | | |
|---|---|---|---|
| 7,680,324 | B2 | 3/2010 | Boncyk et al. |
| 7,775,437 | B2 | 8/2010 | Cohen |
| 7,792,738 | B2 | 9/2010 | Channell |
| 7,881,529 | B2 | 2/2011 | Boncyk et al. |
| 7,899,243 | B2 | 3/2011 | Boncyk et al. |
| 7,899,252 | B2 | 3/2011 | Boncyk et al. |
| 7,970,649 | B2 * | 6/2011 | Wu ................... 705/14.53 |
| 7,983,971 | B1 * | 7/2011 | McLuckie et al. ........... 705/35 |
| 8,138,930 | B1 | 3/2012 | Heath |
| 2002/0124188 | A1 * | 9/2002 | Sherman et al. ............. 713/201 |
| 2003/0064705 | A1 | 4/2003 | Desiderio |
| 2004/0021584 | A1 | 2/2004 | Hartz, Jr. et al. |
| 2004/0024709 | A1 | 2/2004 | Yu et al. |
| 2006/0100951 | A1 | 5/2006 | Mylet et al. |
| 2007/0140595 | A1 | 6/2007 | Taylor et al. |
| 2008/0040278 | A1 | 2/2008 | DeWitt |
| 2008/0214210 | A1 | 9/2008 | Rasanen et al. |
| 2008/0243721 | A1 * | 10/2008 | Joao ....................... 705/36 R |
| 2008/0268876 | A1 | 10/2008 | Gelfand et al. |
| 2009/0094125 | A1 | 4/2009 | Killian et al. |
| 2009/0102859 | A1 | 4/2009 | Athsani et al. |
| 2009/0140839 | A1 | 6/2009 | Bishop et al. |
| 2009/0144164 | A1 | 6/2009 | Wane et al. |
| 2009/0171850 | A1 | 7/2009 | Yuval |
| 2009/0182748 | A1 | 7/2009 | Walker |
| 2009/0204511 | A1 | 8/2009 | Tsang |
| 2009/0250515 | A1 | 10/2009 | Todd et al. |
| 2010/0130226 | A1 | 5/2010 | Arrasvuori et al. |
| 2010/0185529 | A1 | 7/2010 | Chesnut et al. |
| 2010/0250581 | A1 | 9/2010 | Chau |
| 2011/0022540 | A1 | 1/2011 | Stern et al. |
| 2011/0034176 | A1 | 2/2011 | Lord et al. |
| 2011/0119155 | A1 | 5/2011 | Hammad et al. |
| 2011/0202460 | A1 * | 8/2011 | Buer et al. ................ 705/44 |
| 2011/0202466 | A1 | 8/2011 | Carter |

OTHER PUBLICATIONS

International Searching Authority. PCT International Search Report and Written Opinion dated May 22, 2012, PCT International Application No. PCT/US12/28008. Name of Applicant: Bank of America Corporation. English Language. 13 pages.

International Searching Authority. PCT International Search Report and Written Opinion dated Sep. 24, 2012. PCT International Application No. PCT/US12/48697. Name of Applicant: Bank of America Corporation. English Language. 14 pages.

International Searching Authority. PCT International Search Report and Written Opinion dated Jun. 14, 2012. PCT International Application No. PCT/US12/27892. Name of Applicant: Bank of America Corporation. English Language. 19 pages.

International Searching Authority. PCT International Search Report and Written Opinion dated Jun. 8, 2012. PCT International Application No. PCT/US2012/027912. Name of Applicant: Bank of America Corporation. English Language. 12 pages.

International Searching Authority. PCT International Search Report and Written Opinion dated Feb. 5, 2013. PCT International Application No. PCT/US12/27890. Name of Applicant: Bank of America Corporation. English Language. 16 pages.

* cited by examiner

PRESENTING INVESTMENT-RELATED INFORMATION ON A MOBILE COMMUNICATION DEVICE

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,405, filed Apr. 22, 2011, entitled "Presenting Investment-Related Information on a Mobile Communication Device," the entirety of each of which is incorporated herein by reference.

FIELD

In general, embodiments herein disclosed relate to commerce and, more specifically presenting a display of investment-related information on a mobile communication device in conjunction with a video stream or image.

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have addition features that are becoming increasing more common and standardized features. Such features include, but are not limited to, location-determining devices, such as Global Positioning System (GPS) devices; sensor devices, such as accelerometers; and high-resolution video cameras.

Therefore, a need exists to further the capabilities of mobile communication devices to provide mobile device user's with greater access to information

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.\

Methods, apparatus, systems and computer program products are described herein that provide for presenting investment-related information in conjunction with a video stream or image that includes investment-related business entity or an object associated with the investment-related entity. Investment-related business entities or an objects associated with the investment-related entity (e.g., logos, products or the like) may be identified that are proximate to a mobile communication device via object recognition techniques, product codes, wireless communication, location determination or the like. Once investment-related business entities or an objects associated with the investment-related entity have been identified, investment-related information may be retrieved and investment-related information indicators are displayed in the video stream or image proximate to the display of the investment-related business entity or an object associated with the investment-related entity. The user can configure the application such that only investment-related information associated with user-specified businesses or business types is presented. In addition, the user may specify other criteria for presenting investment-related information, such as investment performance, friend/family/expert investment in a business entity or the like. The investment-related information may include current investment performance, historical investment performance, links to online purchasing of the investment or the like.

A method for providing investment-related information defines first embodiments of the invention. The method includes identifying one of a business entity or an object associated with the business entity. The business entity or object is proximate in location to a mobile communication device. Additionally, the method includes retrieving investment-related information associated with the identified business entity; and presenting, within a display of a video stream on the mobile communication device, an investment-related information indicator. The indicator provides access to the investment-related information and is presented proximate in location to display of either the business entity or the object associated with the business entity.

In specific embodiments of the method, identifying further includes capturing, by the mobile communication device, images of the business entity or the object associated with the business entity. In such embodiments of the method, capturing images may further include implementing object recognition processing to identify one or more images as corresponding to the business entity or the object. In other such embodiments of the method, capturing images further includes capturing a code located on or proximate to the business entity or the object and reading the code to identify the business entity.

In still further specific embodiments of the method, identifying further includes receiving, at the mobile communication device, business entity-identifying wireless communication from the business entity, the object or a tag associated with the business entity or object. In other specific embodiments of the method, identifying further includes determining a location of the mobile communication device and determining the business entity based on the determined location.

Moreover, in other specific embodiments of the method the investment-related information includes a real-time stock price quote for the business entity. In further related embodiments of the method, the investment-related information includes one or more of government filing data, investor presentations, competitor performance comparison data, stock trend data, stock trade history data, or news-related data. In additional related embodiments of the method, the investment-related information includes a selectable link to a network entity configured to provide a user an ability to purchase stock in the business entity.

In other specific embodiments of the method, the investment-related information is further defined as user-configurable investment-related information, such that, the user may preconfigure the application to retrieve and present investment-related information specifically desired by the user. In still other related embodiments of the method, the investment-related information includes identification of one or more individuals associated with a user of the mobile communication device that invests in the business entity, such as friends, family members or the like.

In additional related embodiments the method includes communicating a user alert that is configured to notify a user of the mobile communication device of the investment-related information. IN such embodiments of the method, the user alert may be user-configured based on one or more of business entity type, business entity performance or identity of business entity investors An apparatus for providing investment-related information provides for second embodiments of the invention. The apparatus includes a computing platform having a memory and at least one processor in communication with the memory. Additionally, the apparatus includes a business entity identification application stored in the memory, executable by the processor and configured to identify business entities and objects associated with the business entities. The business entities or the objects are proximate in location to a mobile communication device. Further the apparatus includes an investment-related information retrieval application stored in the memory, executable by the first processor and configured to retrieve investment-related information associated with the identified business entities. Moreover, the apparatus includes an investment-related information presentation application stored in the memory, executable by the processor and configured to present, within a display of a video stream on the mobile communication device, at least one investment-related information indicator, wherein the indicator provides access to the investment-related information and is presented proximate in location to display of either one of the business entities or one of the objects associated with a business entity.

A computer program product defines third embodiments of the invention. The computer program product includes a non-transitory computer-readable medium the medium includes computer-executable instructions that cause a computer to implement steps. The steps include identifying one of a business entity or an object associated with the business entity. The business entity or object is proximate in location to a mobile communication device. The steps further include retrieving investment-related information associated with the identified business entity. Additionally, the steps include presenting, within a display of a video stream on the mobile communication device, an investment-related information indicator, wherein the indicator provides access to the investment-related information and is presented proximate in location to display of either the business entity or the object associated with the business entity.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
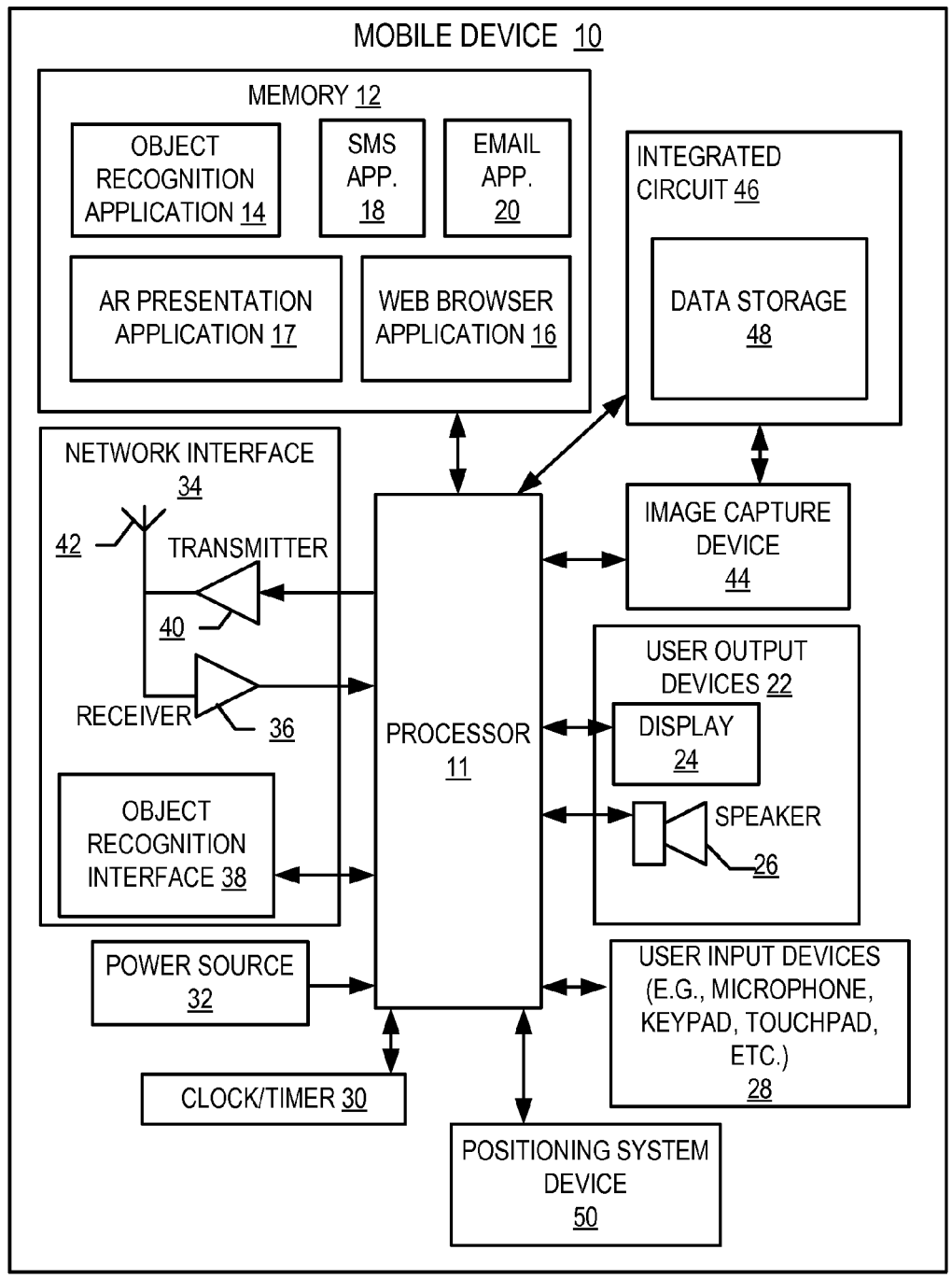
Figure 2:
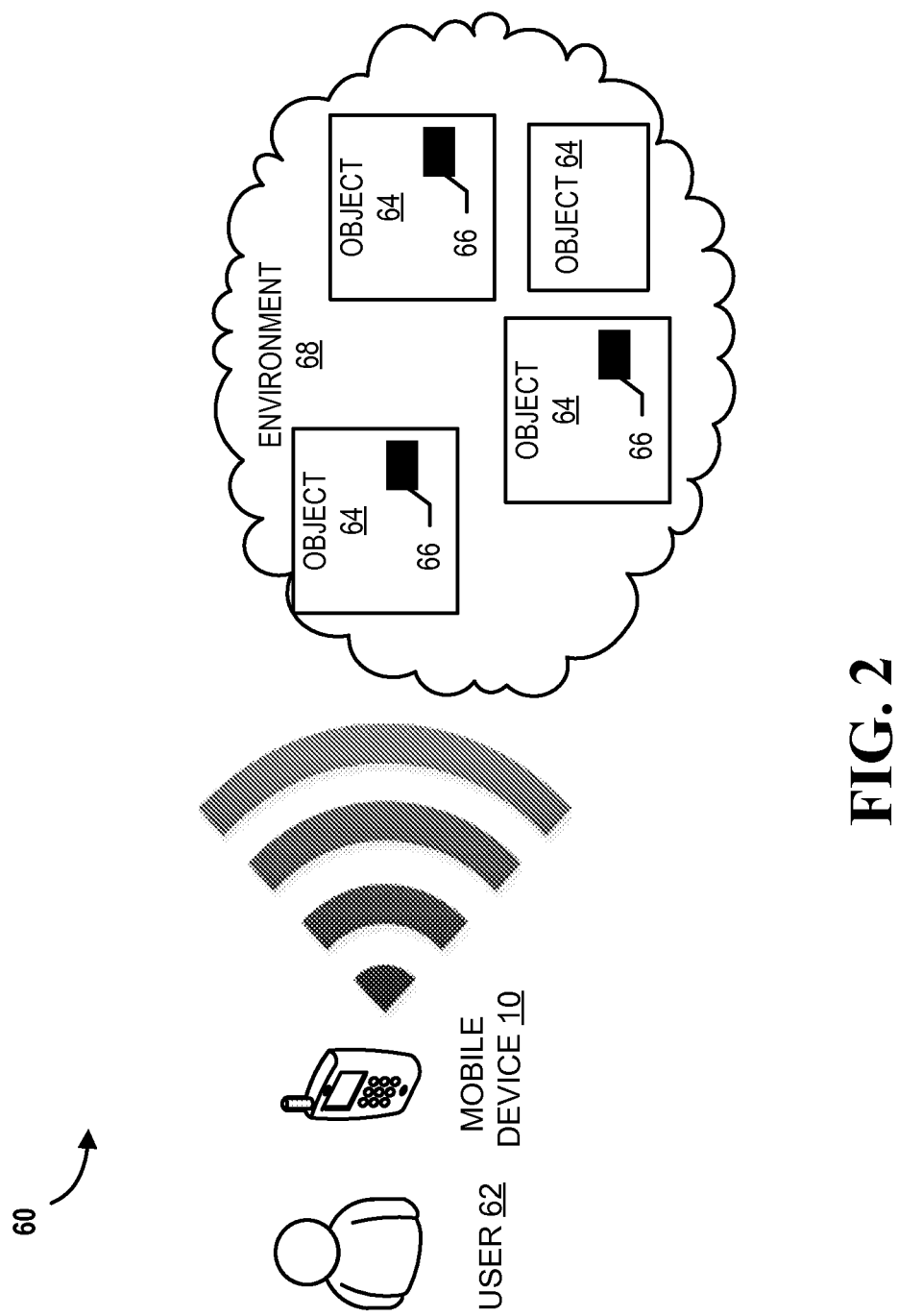
Figure 3:
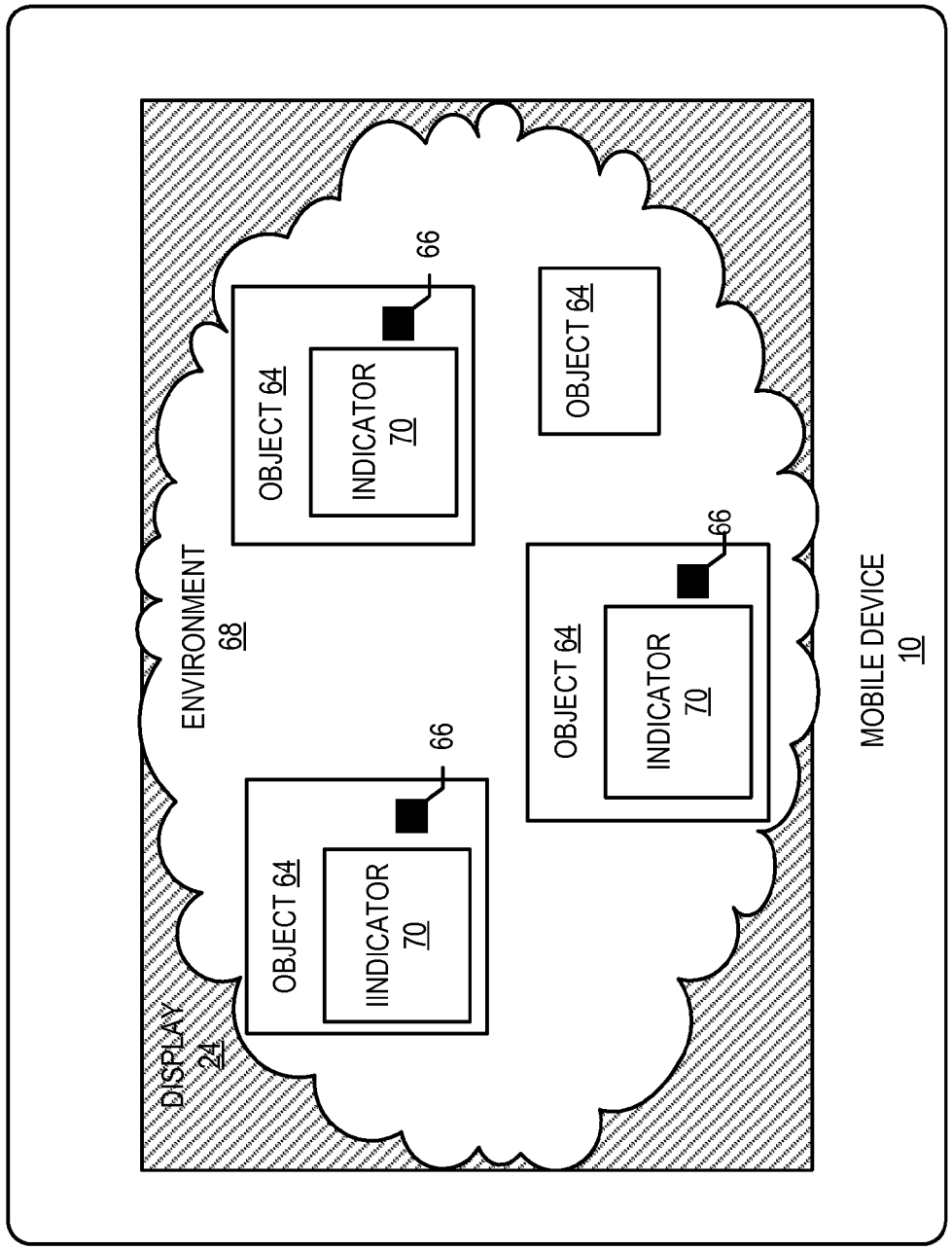
Figure 4:
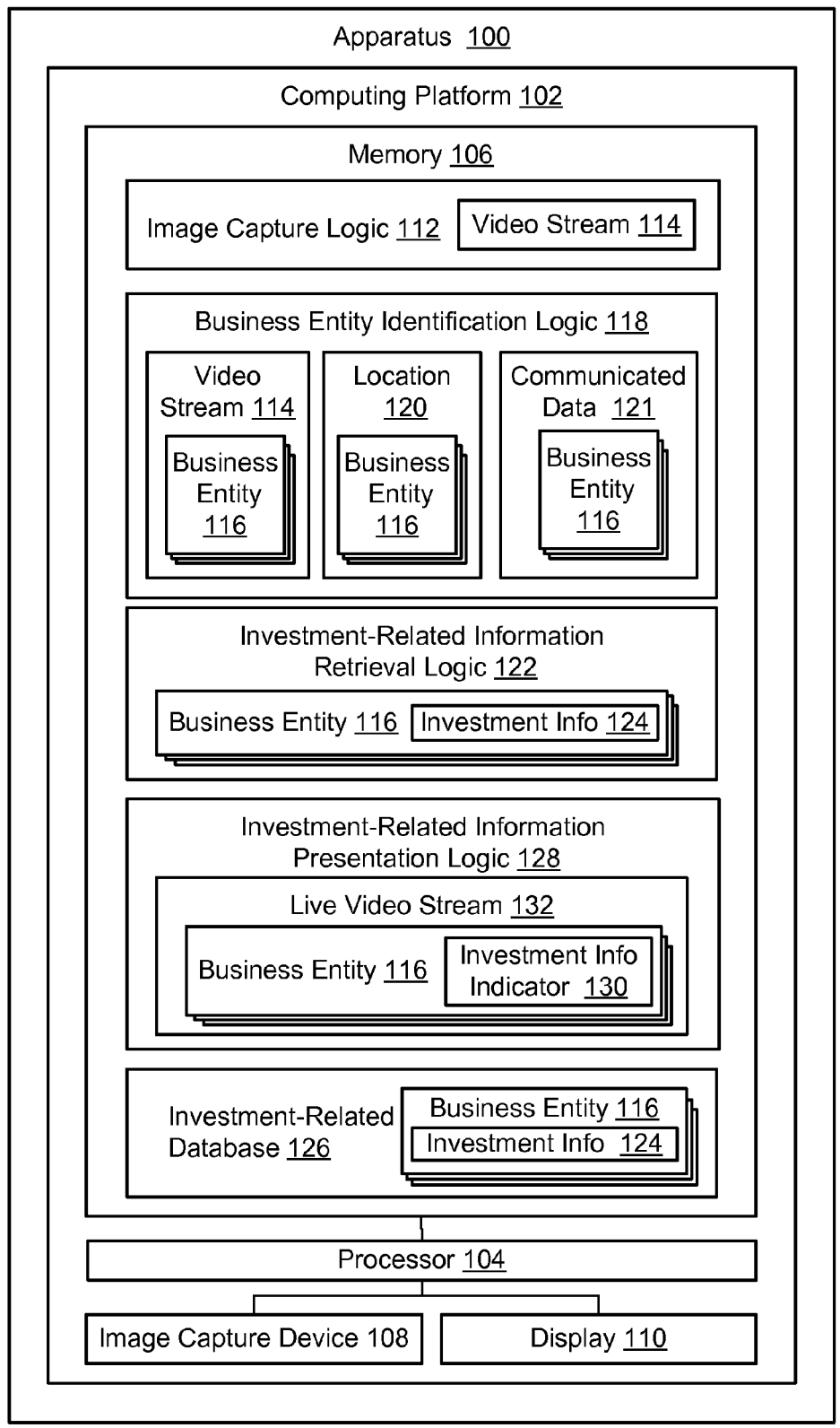
Figure 5:
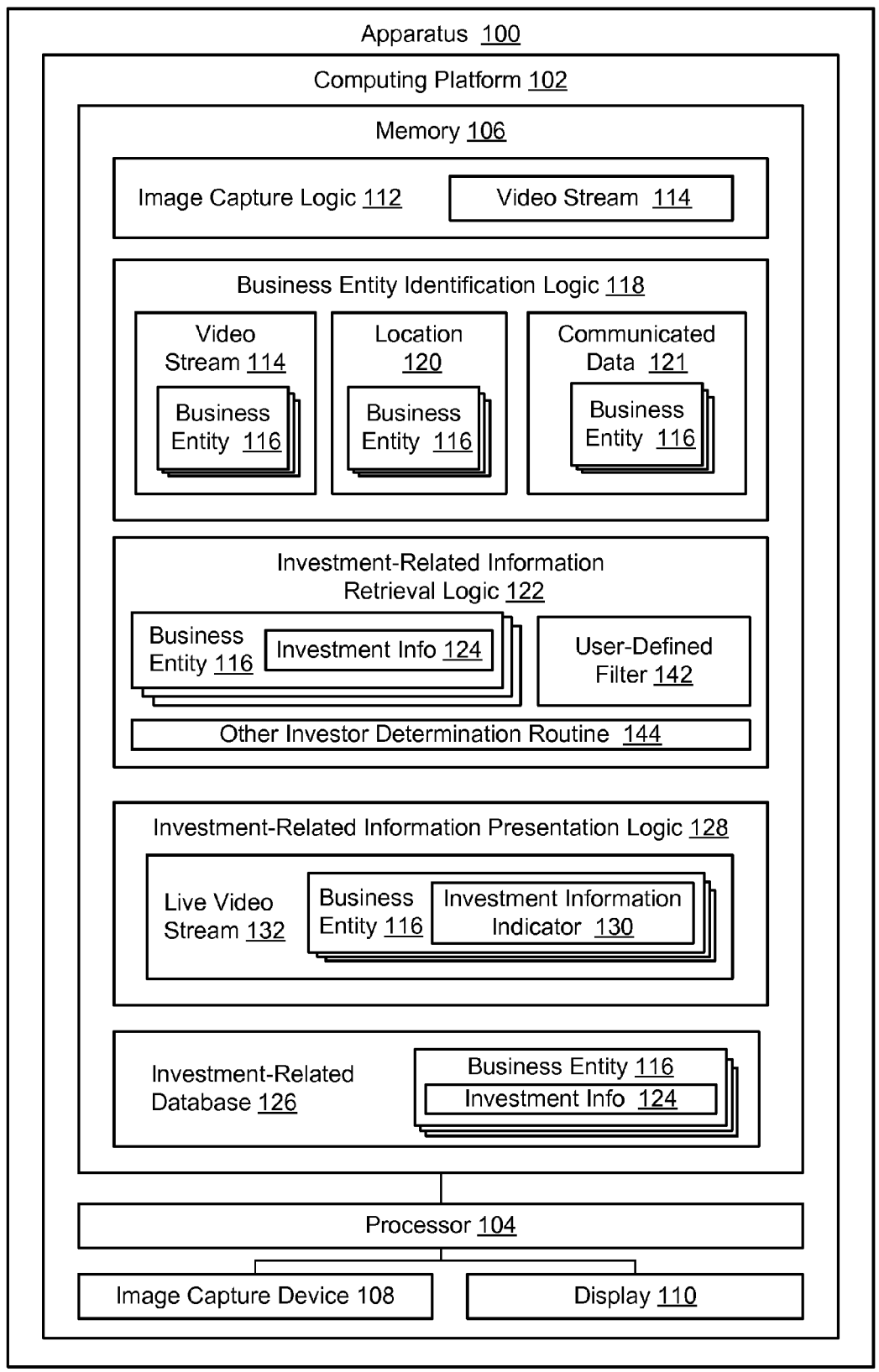
Figure 6:
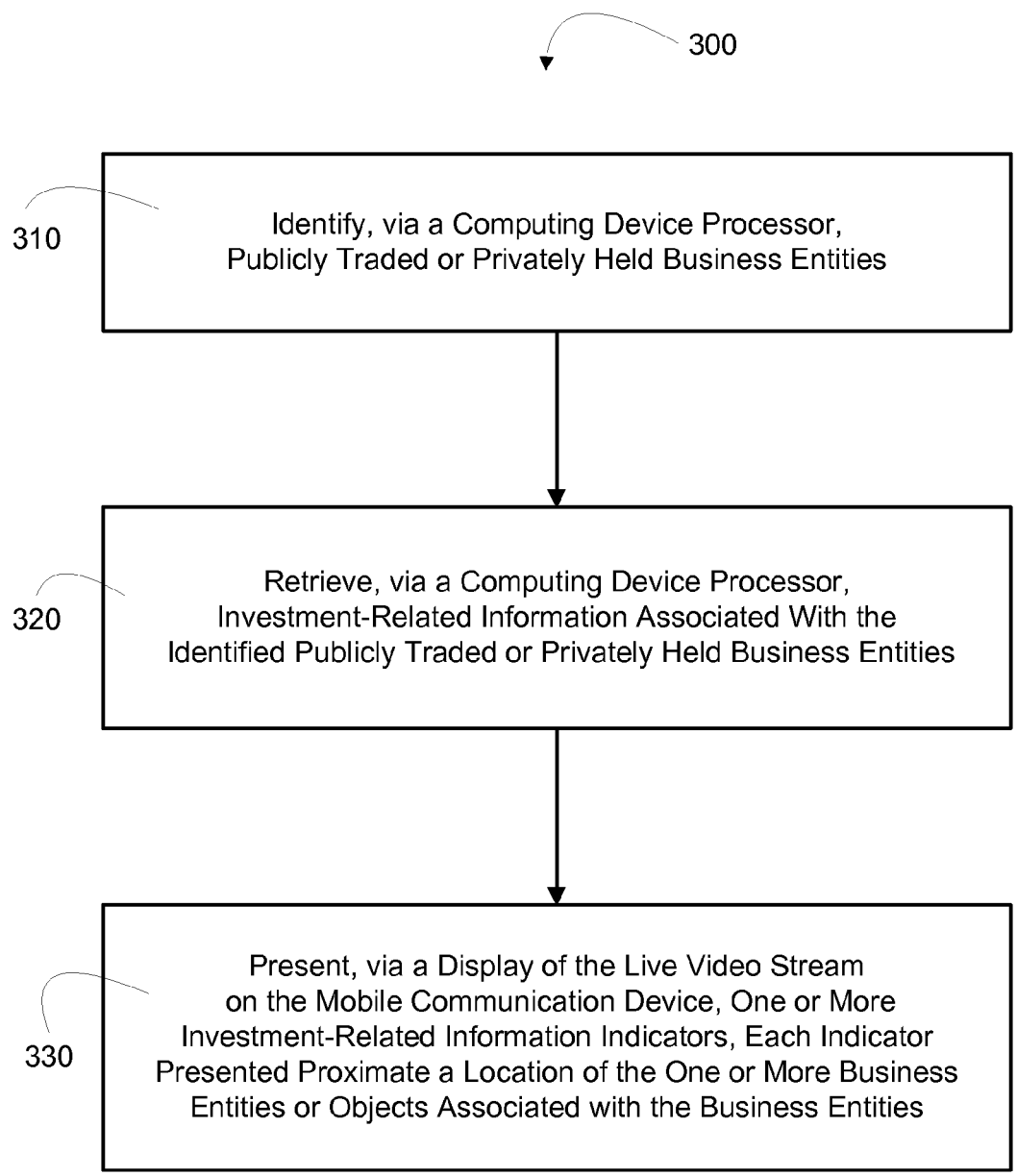

Having thus described embodiments of the invention in general terms, reference will now be made to the accompanying drawings, which are not necessarily drawn to scale, and wherein:

FIG. 1 is a block diagram illustrating a mobile device, in accordance with an embodiment of the invention;

FIG. 2 is a block diagram illustrating an object recognition environment, in accordance with an embodiment of the invention;

FIG. 3 is a block diagram illustrating a mobile device, in accordance with an embodiment of the invention;

FIG. 4 is a block diagram of an apparatus configured to present investment-related information in conjunction with display of the associated business entity in a video stream or image on a mobile communication device, in accordance with embodiment of the present invention;

FIG. 5 is an additional block diagram of an apparatus configured to present investment-related information in conjunction with display of the associated business entity in a video stream or image on a mobile communication device, in accordance with embodiment of the present invention; and FIG. 6 is a flow diagram illustrating a method for presenting investment-related information in conjunction with display of the associated business entity in a video stream or image on a mobile communication device, in accordance with embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for presenting investment-related information on mobile communication devices and, specifically presenting investment-related information in conjunction with the display of a video stream or image. Specific embodiments of the invention rely on presenting investment-related information in an augmented reality environment, or more generally referred to as mediated reality, in which indicators of the investment-related information are displayed in association with the business entity or an object associated with the business entity in the video stream or image.

One such example of an AR application platform is Layar, available from Layar, Amsterdam, the Netherlands. The Layar platform technology analyzes location data, compass direction data, and the like in combination with information related to the objects, locations or the like in the video stream to create browse-able "hot-spots" or "tags" that are superimposed on the mobile device display, resulting in an experience described as "reality browsing".

FIG. 1 illustrates an embodiment of a mobile device 10 that may be configured to execute object recognition and Augmented Reality (AR) functionality, in accordance with specific embodiments of the present invention. A "mobile device" 10 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 10 may generally include a processor 11 communicably coupled to such devices as a memory 12, user output devices 22, user input devices 28, a network interface 34, a power source 32, a clock or other timer 30, an image capture device 44, a positioning system device 50 (e.g., a Global Positioning System (GPS) device), one or more integrated circuits 46, etc.

In some embodiments, the mobile device and/or the server access one or more databases or data stores (not shown in FIG. 1) to search for and/or retrieve information related to the object and/or marker. In some embodiments, the mobile device and/or the server access one or more data stores local to the mobile device and/or server and in other embodiments, the mobile device and/or server access data stores remote to the mobile device and/or server. In some embodiments, the mobile device and/or server access both a memory and/or data store local to the mobile device and/or server as well as a data store remote from the mobile device and/or server The processor 11, and other processors described herein, may generally include circuitry for implementing communication and/or application functions of the mobile device 10. For example, the processor 11 may include a digital signal processor device, a microprocessor device, and various analog to digital converters, digital to analog converters, and/or other support circuits. Control and signal processing functions of the mobile device 10 may be allocated between these devices according to their respective capabilities. The processor 11 thus may also include the functionality to encode and interleave messages and data prior to modulation and transmission. The processor 11 may additionally include an internal data modem. Further, the processor 11 may include functionality to operate one or more software programs or applications, which may be stored in the memory 12. For example, the processor 11 may be capable of operating a connectivity program, such as a web browser application 16. The web browser application 16 may then allow the mobile device 10 to transmit and receive web content, such as, for example, location-based content and/or other web page content, according to a Wireless Application Protocol (WAP), Hypertext Transfer Protocol (HTTP), and/or the like.

The processor 11 may also be capable of operating applications, such as an object recognition application 14. The object recognition application 14 may be downloaded from a server and stored in the memory 12 of the mobile device 10. Alternatively, the object recognition application 14 may be pre-installed and stored in a memory in the integrated circuit 46. In such an embodiment, the user may not need to download the object recognition application 14 from a server. In some embodiments, the processor 11 may also be capable of operating one or more applications, such as one or more applications functioning as an artificial intelligence ("AI") engine. The processor 11 may recognize objects that it has identified in prior uses by way of the AI engine. In this way, the processor 11 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

The integrated circuit 46 may include the necessary circuitry to provide the object recognition functionality to the mobile device 10. Generally, the integrated circuit 46 will include data storage 48 which may include data associated with the objects within a video stream that the object recognition application 14 identifies as having a certain marker(s) (discussed in relation to FIG. 2). The integrated circuit 46 and/or data storage 48 may be an integrated circuit, a microprocessor, a system-on-a-integrated circuit, a microcontroller, or the like. As discussed above, in one embodiment, the integrated circuit 46 may provide the functionality to the mobile device 10.

Of note, while FIG. 1 illustrates the integrated circuit 46 as a separate and distinct element within the mobile device 10, it will be apparent to those skilled in the art that the object recognition functionality of integrated circuit 46 may be incorporated within other elements in the mobile device 10. For instance, the functionality of the integrated circuit 46 may be incorporated within the mobile device memory 12 and/or processor 11. In a particular embodiment, the functionality of the integrated circuit 46 is incorporated in an element within the mobile device 10 that provides object recognition capabilities to the mobile device 10. Still further, the integrated circuit 46 functionality may be included in a removable storage device such as an SD card or the like.

The processor 11 may be configured to use the network interface 34 to communicate with one or more other devices on a network. In this regard, the network interface 34 may include an antenna 42 operatively coupled to a transmitter 40 and a receiver 36 (together a "transceiver"). The processor 11 may be configured to provide signals to and receive signals from the transmitter 40 and receiver 36, respectively. The signals may include signaling information in accordance with the air interface standard of the applicable cellular system of the wireless telephone network that may be part of the network. In this regard, the mobile device 10 may be configured to operate with one or more air interface standards, communication protocols, modulation types, and access types. By way of illustration, the mobile device 10 may be configured to operate in accordance with any of a number of first, second, third, and/or fourth-generation communication protocols and/or the like. For example, the mobile device 10 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 10 may also be configured to operate in accordance with non-cellular communication mechanisms, such as via a wireless local area network (WLAN) or other communication/data networks.

The network interface 34 may also include an object recognition interface 38 in order to allow a user to execute some or all of the above-described processes with respect to the object recognition application 14 and/or the integrated circuit 46. The object recognition interface 38 may have access to the hardware, e.g., the transceiver, and software previously described with respect to the network interface 34. Furthermore, the object recognition interface 38 may have the ability to connect to and communicate with an external data storage on a separate system within the network as a means of recognizing the object(s) in the video stream.

As described above, the mobile device 100 may have a user interface that includes user output devices 22 and/or user input devices 28. The user output devices 22 may include a display 24 (e.g., a liquid crystal display (LCD) or the like) and a speaker 26 or other audio device, which are operatively coupled to the processor 11. The user input devices 28, which may allow the mobile device 10 to receive data from a user, may include any of a number of devices allowing the mobile device 10 to receive data from a user, such as a keypad, keyboard, touch-screen, touchpad, microphone, mouse, joystick, other pointer device, button, soft key, and/or other input device(s).

The mobile device 10 may further include a power source 32. Generally, the power source 32 is a device that supplies electrical energy to an electrical load. In one embodiment, power source 32 may convert a form of energy such as solar energy, chemical energy, mechanical energy, etc. to electrical energy. Generally, the power source 32 in a mobile device 10 may be a battery, such as a lithium battery, a nickel-metal hydride battery, or the like, that is used for powering various circuits, e.g., the transceiver circuit, and other devices that are used to operate the mobile device 10. Alternatively, the power source 32 may be a power adapter that can connect a power supply from a power outlet to the mobile device 10. In such embodiments, a power adapter may be classified as a power source "in" the mobile device.

The mobile device 10 may also include a memory 12 operatively coupled to the processor 11. As used herein, memory may include any computer readable medium configured to store data, code, or other information. The memory 12 may include volatile memory, such as volatile Random Access Memory (RAM) including a cache area for the temporary storage of data. The memory 12 may also include non-volatile memory, which can be embedded and/or may be removable. The non-volatile memory may additionally or alternatively include an electrically erasable programmable read-only memory (EEPROM), flash memory or the like.

The memory 12 may store any of a number of applications or programs which comprise computer-executable instructions/code executed by the processor 11 to implement the functions of the mobile device 10 described herein. For example, the memory 12 may include such applications as an object recognition application 14, an augmented reality (AR) presentation application 17 (described infra. in relation to FIG. 3), a web browser application 16, a Short Message Service (SMS) application 18, an electronic mail (i.e., email) application 20, etc.

Referring to FIG. 2, a block diagram illustrating an object recognition experience 60 in which a user 62 utilizes a mobile device 10 to capture a video stream that includes an environment 68 is shown. As denoted earlier, the mobile device 10 may be any mobile communication device. The mobile device 10 has the capability of capturing a video stream of the surrounding environment 68. The video capture may be by any means known in the art. In one particular embodiment, the mobile device 10 is a mobile telephone equipped with an image capture device 44 capable of video capture.

The environment 68 contains a number of objects 64. Some of such objects 64 may include a marker 66 identifiable to an object recognition application that is either executed on the mobile device 10 or within the wireless network. A marker 66 may be any type of marker that is a distinguishing feature that can be interpreted by the object recognition application to identify specific objects 64. For instance, a marker 66 may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 66 may be audio and the mobile device 10 may be capable of utilizing audio recognition to identify words or unique sounds broadcast. The marker 66 may be any size, shape, etc. Indeed, in some embodiments, the marker 66 may be very small relative to the object 64 such as the alpha-numeric characters that identify the name or model of an object 64, whereas, in other embodiments, the marker 66 is the entire object 64 such as the unique shape, size, structure, etc.

In some embodiments, the marker 66 is not actually a physical marker located on or being broadcast by the object. For instance, the marker 66 may be some type of identifiable feature that is an indication that the object 64 is nearby (e.g., a tag or placard near the object). In some embodiments, the marker 66 for an object 64 may actually be the marker 66 for a different object 64. For example, the mobile device 10 may recognize a particular building as being "Building A." Data stored in the object recognition data storage may indicate that "Building B" is located directly to the east and next to "Building A." Thus, markers 66 for an object 64 that are not located on or being broadcast by the object 64 are generally based on fixed facts about the object 64 (e.g., "Building B" is next to "Building A"). However, it is not a requirement that such a marker 66 be such a fixed fact. The marker 66 may be anything that enables the mobile device 10 to interpret to a desired confidence level what the object is.

The marker 66 may also be or include social network data, such as data retrieved or communicated from the Internet, such as tweets, blog posts, social media posts, various types of messages and/or the like. In other embodiments, the marker 66 is provided in addition to social network data as mentioned above. For example, the mobile device 10 may capture a video stream and/or one or more still shots including a large gathering of people.

In some embodiments, the mobile device and/or server access one or more other servers, social media networks, applications and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

While FIG. 2 illustrates that the objects 64 with markers 66 only include a single marker 66, it will be appreciated that the object 64 may have any number of markers 66 with each equally capable of identifying the object 66. Similarly, multiple markers 64 may be identified by the mobile device 100 such that the combination of the markers 66 may be utilized to identify the object 64. For example, the mobile device 10 may utilize facial recognition markers 66 to identify a person and utilize a separate marker 66 to confirm the identification to the desired confidence level that the person is the identified person.

In some embodiments, a marker 66 may be the location of the object 64. In such embodiments, the mobile device 10 may utilize Global Positioning System (GPS) hardware and/or software or some other location determining mechanism to determine the location of the user 62 and/or object 64. As noted above, a location-based marker 66 could be utilized in conjunction with other non-location-based markers 66 identifiable and recognized by the mobile device 10 to identify the object 64. However, in some embodiments, a location-based marker may be the only marker 66. For instance, in such embodiments, the mobile device 10 may utilize GPS software to determine the location of the user 62 and a compass device or software to determine what direction the mobile device 10 is facing in order to identify the object 64. In still further embodiments, the mobile device 10 does not utilize any GPS data in the identification. In such embodiments, markers 66 utilized to identify the object 64 are not location-based.

FIG. 3 illustrates a mobile device 10, specifically the display 24 of the mobile 10, wherein the device 10 has executed an object recognition application 14 and an AR presentation application 17 to present within the display 24 indications of recognized objects within the live video stream (i.e., surrounding environment 68). The mobile device 10 is configured to rely on markers 66 to identify objects 64 that are associated with product offers, products with extended warranties, new products and the like, and indicate to the user 62 the identified objects 64 by displaying an indicator 70 on the mobile device display 130 in conjunction with display of the live video stream. As illustrated, if an object 64 does not have any markers 66 (or at least enough markers 66 to yield object identification), the object 64 will be displayed without an associated indicator 70.

The object recognition application 14 may use any type of means in order to identify desired objects 64. For instance, the object recognition application 14 may utilize one or more pattern recognition algorithms to analyze objects in the environment 68 and compare with markers 66 in data storage 48 which may be contained within the mobile device 10 (such as within integrated circuit 46) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 64 within the real-time video stream, the AR presentation application 17 is configured to superimpose an indicator 70 on the mobile device display 24. The indicator 70 is generally a graphical representation that highlights or outlines the object 64 and may be activatable (i.e., include an embedded link), such that the user 62 may "select" the indicator 70 and retrieve information related to the identified object. The information may include any desired information associated with the selected object and may range from basic information to greatly detailed information. In some embodiments, the indicator 70 may provide the user 62 with an internet hyperlink to further information on the object 64. The information may include, for example, all types of media, such as text, images, clipart, video clips, movies, or any other type of information desired. In yet other embodiments, the indicator 70 information related to the identified object may be visualized by the user 62 without "selecting" the indicator 70.

In embodiments in which the indicator 70 provides an interactive tab to the user 62, the user 62 may select the indicator 70 by any conventional means, e.g., keystroke, touch, voice command or the like, for interaction with the mobile device 10. For instance, in some embodiments, the user 62 may utilize an input device 28 such as a keyboard to highlight and select the indicator 70 in order to retrieve the information. In a particular embodiment, the mobile device display 24 includes a touch screen that the user may employ to select the indicator 70 utilizing the user's finger, a stylus, or the like.

In some embodiments, the indicator 70 is not be interactive and simply provides information to the user 62 by superimposing the indicator 70 onto the display 24. For example, in some instances it may be beneficial for the AR presentation application 17 to merely identify an object 64, e.g., just identify the object's name/title, give brief information about the object, etc., rather than provide extensive detail that requires interaction with the indicator 70. The AR presentation application 17 is capable of being tailored to a user's desired preferences.

Furthermore, the indicator 70 may be displayed at any size on the mobile device display 24. The indicator 70 may be small enough that it is positioned on or next to the object 64 being identified such that the object 64 remains discernible behind the indicator 70. Additionally, the indicator 70 may be semi-transparent or an outline of the object 64, such that the object 64 remains discernible behind or enclosed by the indicator 70. In other embodiments, the indicator 70 may be large enough to completely cover the object 64 portrayed on the display 24. Indeed, in some embodiments, the indicator 70 may cover a majority or the entirety of the mobile device display 24.

The user 62 may opt to execute the object recognition application 14 and AR presentation application 17 at any desired moment and begin video capture and analysis. However, in some embodiments, the object recognition application 14 and AR presentation application 17 includes an "always on" feature in which the mobile device 10 is continuously capturing video and analyzing the objects 64 within the video stream. In such embodiments, the object recognition application 14 may be configured to alert the user 62 that a particular object 64 has been identified. The user 62 may set any number of user preferences to tailor the object recognition and AR presentation experience to their needs. For instance, the user 62 may opt to only be alerted if a certain particular object 64 is identified. Additionally, it will be appreciated that the "always on" feature in which video is continuously captured may consume the mobile device power source 32 more quickly. Thus, in some embodiments, the "always on" feature may disengage if a determined event occurs such as low power source 32, low levels of light for an extended period of time (e.g., such as if the mobile device 10 is in a user's pocket obstructing a clear view of the environment 68 from the mobile device 10), if the mobile device 10 remains stationary (thus receiving the same video stream) for an extended period of time, the user sets a certain time of day to disengage, etc. Conversely, if the "always on" feature is disengaged due to the occurrence of such an event, the user 62 may opt for the "always on" feature to re-engage after the duration of the disengaging event (e.g., power source 32 is re-charged, light levels are increased, etc.).

In some embodiments, the user 62 may identify objects 64 that the object recognition application 14 does not identify and add it to the data storage 48 with desired information in order to be identified and/or displayed in the future. For instance, the user 62 may select an unidentified object 64 and enter a name/title and/or any other desired information for the unidentified object 64. In such embodiments, the object recognition application 14 may detect/record certain markers 66 about the object so that the pattern recognition algorithm(s) (or other identification means) may detect the object 64 in the future. Furthermore, in cases where the object information is within the data storage 48, but the object recognition application 14 fails to identify the object 64 (e.g., one or more identifying characteristics or markers 66 of the object has changed since it was added to the data storage 48 or the marker 66 simply was not identified), the user 62 may select the object 64 and associate it with an object 64 already stored in the data storage 48. In such cases, the object recognition application 14 may be capable of updating the markers 66 for the object 64 in order to identify the object in future video streams.

In addition, in some embodiments, the user 62 may opt to edit the information or add to the information provided by the indicator 70. For instance, the user 62 may opt to include user-specific information about a certain object 64 such that the information may be displayed upon a future identification of the object 64. Conversely, in some embodiments, the user may opt to delete or hide an object 64 from being identified and an indicator 70 associated therewith being displayed on the mobile device display 24.

Furthermore, in some instances, an object 64 may include one or more markers 66 identified by the object recognition application 14 that leads the object recognition application 14 to associate an object with more than one objects in the data storage 48. In such instances, the user 62 may be presented with multiple candidate identifications and may opt to choose the appropriate identification or input a different identification. The multiple candidates may be presented to the user 62 by any means. For instance, in one embodiment, the candidates are presented to the user 62 as a list wherein the "strongest" candidate is listed first based on reliability of the identification. Upon input by the user 62 identifying the object 64, the object recognition application 14 may "learn" from the input and store additional markers 66 in order to avoid multiple identification candidates for the same object 64 in future identifications.

Additionally, the object recognition application 14 may utilize other metrics for identification than identification algorithms. For instance, the object recognition application 14 may utilize the user's location, time of day, season, weather, speed of location changes (e.g., walking versus traveling), "busyness" (e.g., how many objects are in motion versus stationary in the video stream), as well any number of other conceivable factors in determining the identification of objects 64. Moreover, the user 62 may input preferences or other metrics for which the object recognition application 14 may utilize to narrow results of identified objects 64.

In some embodiments, the AR presentation application 17 may have the ability to gather and report user interactions with displayed indicators 70. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object.

Such tags and/or postings may be stored in a predetermined memory and/or database for ease of searching and retrieval.

Referring to FIG. 4, an apparatus 100 configured for presenting investment-related information in conjunction with display of the associated business entity (or an object associated with the business entity) in a live video stream on a mobile communication device, in accordance with embodiments of the present invention. The apparatus includes a computing platform 102 having a processor 104 and a memory 106 in communication with the processor. Additionally, apparatus 100 includes image capture device 108 and display 110 both in communication with processor 104.

It should be noted that the apparatus 100 may include more than one computing device. For example, apparatus 100 may include a mobile communication device and a network device, which operate in unison to present investment-related information in conjunction with display of the associated business entity (or an object associated with the business entity) in a live video stream on a mobile communication device. Thus, the application shown and described in apparatus 100 may reside and be executed on a mobile communication device or a network device that is in wireless communication with the mobile communication device. A mobile communication device may be a mobile cellular telephone, such as a smart phone or the like, a Personal Data Assistant (PDA) a tablet computing device, a laptop device or any other computing device having an image capture device 108 and a display 110. It should be noted that while many embodiments of the mobile communication device are personal and/or handheld devices, in other embodiments of the invention a mobile communication device may be permanently or temporarily located within a moving vehicle, such as an automobile or the like.

The memory 106 of apparatus 100 may include image capture application 112 that is in communication with image capture device 108 and configured to capture a video stream 114. It should be noted that the video stream 114 may be captured from various different environments. For example, the video stream 114 may be captured while shopping in a retail location, walking in a mall, on a city street, etc. In addition, the video stream 114 may be captured from a mobile communication device affixed, permanently or temporarily, to a moving vehicle, such as an automobile navigating a commercially heavy area, such as a downtown area or the like. In other embodiments, the video stream 114 may be captured while watching media, such as television, Internet or the like, reading media, such as via the Internet, a billboard advertisement, magazine, newspaper or the like.

In some embodiments, the information provided by the real-time video stream may be compared to data provided to the system through an API. In this way, the data may be stored in a separate API and be implemented by request from the mobile device and/or server accesses another application by way of an API.

The memory 106 of apparatus 100 additionally includes business entity identification application 118 that is configured to identify business entities 116, (both publically traded or privately held) such as corporations or the like that are within the proximate vicinity of the mobile communication device. In specific embodiments of the invention, the business entity identification application 118 identifies business entities 116 based, at least in part, on the images captured in the video stream 114. In such embodiments, the business entity identification application 118 may implement any known or future known visual-type identification mechanisms. For example, business entity identification application 118 may implement object recognition techniques based on characteristics, indicia (e.g., Optical Character Recognition (OCR) or the like), logos, shapes and the like associated with the business entity, brand, mascots, spokesperson associated with the business, television commercial personalities associated with the business, cartoon characters, products manufactured by the business entity, and/or the like. In addition, in those embodiments in which the images are of products manufactured/distributed by the business entity, the products or tags displayed in conjunction with the products may include a visually readable code, such as Quick Response (QR) code, barcode or the like. In such embodiments, the business entity identification application 118 may be implemented to decipher the code to identify the business entity associated with the product.

In other embodiments of the invention, the business entity identification application 118 may identify the one or more business entities 116 based, at least in part, on the geographic location 120 of the business entities. For example, a mobile communication device may be equipped with location determining mechanisms, such as Global Positioning System (GPS) devices and modules, which determine the location of the device and the location of business entities based on known geographic positional locations/addresses.

In other related embodiments, business entity identification logic 118 may be configured to sense and receive short range communicated data 121, such as via Near Field Communication (NFC), Radio Frequency Identification (RFID) or the like, from products manufactured/distributed by a business entity or other objects associated with the business entity. The information communicated from attached, embedded or proximate short range communication mechanisms may include information that identifies the business entity or is associated with identifying the business entity.

The memory 106 of apparatus 100 additionally includes investment-related information retrieval application 122 configured to retrieve investment-related information 124 associated with the identified investment business entities 116. Thus, investment-related information retrieval application 122 may be in communication with investment-related information retrieval database 126 which stores or otherwise provides investment-related information 124 for the identified business entities 116. In one specific embodiment of the invention, the investment-related information retrieval database 126 provides access to real-time or near-real stock quotes for publicly traded business entities, such that the investment-related information retrieval application 122 is configured to retrieve a current stock quote. In other embodiments of the invention, information retrieval database 126 provides access to network locations, for example hyperlinks or the like, for providing the mobile communication device user access to network-based investment-related information, such as websites or the like.

The memory 106 of apparatus 100 additionally includes investment-related information presentation application 128 that is configured to present one or more investment information indicators 130, on a display of mobile communication device, each investment information indicator 130 presented in a live video stream 132 proximate a location of the business entity 116 or a product/object associated with the business entity 116.

In one embodiment of the invention the investment-related information indicator 130 may be a graphical tag, highlighted area or an outline around the border of the business entity 116 or a product/object associated with the business entity 116 as displayed in the live video stream 132. In specific embodiments of the invention, the indicator may display at least a portion of the investment-related information, such as stock market ticket designator for the business entity and/or the current stock quote, stock price trajectory, or the like.

In other specific embodiments of the invention, the user of the mobile communication device may activate the investment-related information indicator 130, through touch, mouse-pointer click, keypad, voice command or the like, to display the investment-related information or provide additional investment-related information. In specific embodiments of the invention, activating the investment-related information indicator 130 may provide for accessing a network website for purchasing or otherwise trading in the stock of the business entity 116 and/or providing a current view of the user's investment portfolio along side the purchasing or trading of stock.

In specific embodiments of the invention, the user of the mobile communication may be actively "looking" for investment-related information by positioning the image capture device 108 in front of business entities or products associated with business entities products so as to capture the video stream 114, subsequently identify the business entity or entities, retrieve investment information associated with the business entities and present the investment-related information indicators 130 in the live video stream 132 that the user is viewing. For example, the user positions the mobile device to scan a store aisle or the store fronts/signage in a shopping mall.

In other specific embodiments of the invention, the user may be passively "looking" for investment-related information, such as when the apparatus 100 has been configured to search for user-specified investment-related information or the like. In such a passive mode, the mobile communication device may be in a continuously-on mode and/or an intermittent-on mode based on a predetermined schedule or device activity. In the passive mode, presentation of investment-related information may require that the user be prompted to notify the user of the investment-related information. The prompt may include communicating an alert to the user, such as an audio alert communicated from the mobile communication device, e.g., an audible alarm or the like, and/or a visual alert, e.g., display of a flashing light on the mobile communication device or the like.

FIG. 5 is an additional block diagram of presenting investment-related information in conjunction with display of the associated business entity (or an object associated with the business entity) in a live video stream on a mobile communication device, in accordance with embodiments of the present invention. In addition to highlighting and describing further details of the invention, FIG. 5 provides for alternate embodiments of the invention. The apparatus 100 includes a computing platform 102 having at least one processor 104 and a memory 106 in communication with the processor. Memory 106 may be resident on mobile communication device or at least a portion of memory 106 may be remote memory that is network accessible to a mobile communication device, for example, at least a portion of memory 106 may reside on servers or the like as part of the offer providing entity's network. Memory 106 may comprise volatile and nonvolatile memory such as read-only and/or random-access memory (RAM and ROM), EPROM, EEPROM, flash cards, or any memory common to computing platforms. Further, memory 106 may include one or more flash memory cells, or may be any secondary or tertiary storage device, such as magnetic media, optical media, tape, or soft or hard disk.

Processor 104 may be an application-specific integrated circuit ("ASIC"), or other integrated circuit set, processor, logic circuit, or other data processing device. Processor 104 or other processor such as an Application Specific Integrated Circuit (ASIC) may execute an application programming interface ("API") layer (not shown in FIG. 5) that interfaces with any resident programs or modules, such as business entity identification application 118, investment-related information retrieval application 122, and investment-related information presentation application 128 stored in the memory 106 of the apparatus 100.

Processor 104 may include various processing subsystems (not shown in FIG. 5) embodied in hardware, firmware, software, and combinations thereof, that enable the functionality of apparatus 100 and the operability of the apparatus 100 on a network. For example, processing subsystems allow for initiating and maintaining communications, and exchanging data, with other networked devices. For the disclosed embodiments, processing subsystems of apparatus 100 may include any subsystem used in conjunction with applications, modules, components and routines described herein.

As previously discussed, the memory 106 of apparatus 100 may include image capture application 112 that is in communication with image capture device 108 and configured to capture a video stream 114 and/or images.

Additionally, memory 106 includes business entity identification application 118 that is configured to identify one or more investment business entities 116 or objects associated with an investment business entity that are proximate in location to the mobile communication device. In specific embodiments of the apparatus, the business entity identification application 118 is configured to identify the business entities 116 based on information in the video stream 114. For example, business entity identification application 118 may implement object or image recognition techniques based on characteristics, indicia (e.g., Optical Character Recognition (OCR) or the like), logos, shapes and the like associated with an image of business entity, a business entity logo, a product associated (e.g., manufactured) with a business entity or the like. In addition, in those embodiments in which the products associated with a business entity or tags displayed in conjunction with the products associated with the business entity include a visually readable code, such as Quick Response (QR) code, bar code or the like, the business entity identification application 118 may be implemented to decipher the code to identify the product.

In other embodiments of the invention, the business entity identification application 118 may identify the one or more business entities 116 based, at least in part, on the geographic location 120 of the business entities. For example, a mobile communication device may be equipped with location determining mechanisms, such as Global Positioning System (GPS) devices and modules, which determines the location of the device and the location of business entities based known geographic positional locations/addresses.

In specific related embodiments, business entity identification application 118 may be configured to sense and receive short range communicated data 121, such as via Near Field Communication (NFC), Radio Frequency Identification (RFID) or the like, from products associated with a business entity or other objects associated with a business entity. The information communicated from attached, embedded or proximate short range communication mechanisms may include information that identifies the business entity or is associated with identifying the business entity.

The memory 106 of apparatus 100 additionally includes investment-related information retrieval application 122 configured to retrieve investment-related information 124 for the identified business entities 116. Thus, investment-related information retrieval application 122 is in communication with investment-related database 126 which provides access to investment-related information 124 associated with the identified business entities 116.

In specific embodiments of the invention, the investment-related information retrieval application 122 may be configured to limit the retrieval of investment-related information based on one or more user-defined filters 142. The user-defined filters 142 may be implemented to limit the business entities and/or the investment-related information presented on the mobile communication device to only those business entities and/or information that the user desires to be informed on. From a business entity perspective, the user-defined filters 142 may include, but are not limited to, type of business entity, business entities invested in by specified individuals, funds, etc. (e.g., friends, family, high-profile investors, those in one's social network or investor network, etc.), business entities having a specified return on investment, rate of profit or the like and the like. From an investment-information perspective, the user defined filters may include, but are not limited to, stock quotes, venture capital/hedge fund investment information, profile of other entities that have invested in the business entity, investor presentations, competitor business entities; trend and trade history, recent news concerning the business entity, a rules based algorithm to automatically purchase stock if a specific user criteria is met, and the like.

As previously discussed in relation to FIG. 4, the memory 106 of apparatus 100 additionally includes investment-related information presentation logic 128 that is configured to present one or more investment-related information indicators 130, on a display of mobile communication device. Each investment-related information indicator 130 is presented in a live video stream 130 proximate a location of the view of an associated business entity 116 or the object associated with the business entity 116.

In one embodiment of the invention, the investment-related information indicators 130 graphical tag, highlight an area, such as specific color or pattern highlighting, or an outline around the border of the product 116 as displayed in the live video stream 130. In specific embodiments, the graphical representation of the indicator may differ depending on the information that the indicator is conveying. For example, a green indicator 130 may represent that the stock value of business entity is trending upward, while a red indicator 130 may represent that the stock value of the business entity is trending downward. The information conveyed by the indicators 130 and the type of graphical representation provided to an indicator 130 may be system configured and/or user configured.

In specific embodiments of the invention, the indicator 130 may be user-activatable. Such that, the user of the mobile communication device may activate the investment-related information indicator 130 through touch, mouse-pointer click, keypad, voice command or the like, to display investment-related information. Additionally, the indicator 130 itself may provide brief investment-related information, such as the current stock price, the market symbol for the business entity or the like. The investment-related information may include but is not limited to, business entity financial profile information, identifying who else has invested in the business entity (e.g., friends, family, high-profile investors and the like), government filings associated with the business entity, investor presentations, competitor business entities and their financial information, stock trend data, trade history data, news/headlines related to the business entity, venture capital/hedge fund investments in the business entity and the like.

In other embodiments, of the invention, activation of the investment-related information indicator 132 may provide for the mobile communication device to initiate communication with a network entity, such as a financial institution website or the like, configured for initiating a transaction to purchase/sell stock, to access brokerage accounts, executive purchases, or otherwise conduct an investment transaction related to the business entity. Further, activation of the investment related information indicator 132 may allow the user a direct video, text and/or voice conference call with his financial analyst to discuss investment options, additions to portfolio, execution of trades, and/or the like. Additionally, if the user does not desire to currently conduct an investment transaction, the presentation application 128 may be configured to allow the user to add the business entity to an investment watch list for possible future investment transactions.

In addition, the presentation application 128 may be configured to share the information presented with friends, family members, stock brokers or the like. Sharing the information can occur by generating and communicating an automated electronic communication, such as an email, SMS/text message or the like, or posting a link to the information on a social network website or the like. Additionally, the presentation application 128 may be configured to provide the user access to a live video or text chat session with a broker who can assist the user with additional business entity information and/or conduct an investment transaction on behalf of the user.

Referring to FIG. 6 a flow diagram is depicted of a method 300 for presenting investment-related information in a live video stream, according to embodiments of the present invention.

At Event 310, publicly traded or privately held business entities are identified. Identification may occur via captured visual information, location information and/or short range communication. In specific embodiments of the invention, a video stream is captured by a mobile communication device, such as a smart phone or the like. The video stream may include images of business entities, products or other objects associated with business entities. For example, a user may move about a city street or shopping mall while capturing a video stream of the environment including the business entities located on the street or within the mall. In additional embodiments, the real-time video stream may be captured from a mobile communication device affixed to a moving vehicle, such as an automobile or the like, such that as the vehicle is driven, real-time video stream may be captured including images of the business entities (i.e., signage, logos and the like) that the vehicle passes.

In specific embodiments, identification of the business entities implements object recognition techniques based on characteristics, indicia (e.g., Optical Character Recognition (OCR) or the like), logos, shapes and the like associated with an image of business entity, a business entity logo, a product associated (e.g., manufactured) with a business entity, an object associate with the business entity or the like. In additional embodiments, in which the products associated with a business entity include a visually readable code, such as Quick Response (QR) code, bar code or the like or tags displayed in conjunction with the products or objects associated with the business entity include the visually readable code, identification of the business entities may include capture and decipher of such codes to identify the business entity.

In other related embodiments, business entity identification logic 118 may be configured to sense and receive short range communicated data 121, such as via Near Field Communication (NFC), Radio Frequency Identification (RFID) or the like, from products manufactured/distributed by a business entity or other objects associated with the business entity. The information communicated from attached, embedded or proximate short range communication mechanisms may include information that identifies the business entity or is associated with identifying the business entity.

At Event 330, investment-related information associated with the identified business entities is retrieved. The investment-related information may include a current stock prices as well as links to access other networked investment related information. The other investment-related information may include, but is not limited to, business entity financial profile information, identifying who else has invested in the business entity (e.g., friends, family, high-profile investors and the like), government filings associated with the business entity, investor presentations, competitor business entities and their financial information, stock trend data, trade history data, news/headlines related to the business entity, venture capital/hedge fund investments in the business entity, social network recommendations, financial analysis recommendations, morning star rating, companies similarly situated as current investments, and the like.

At Event 330, one or more investment-related information indicators are presented on the display of a mobile communication device in conjunction with a live video stream. Each indicator is displayed proximate a location of an associated business entity or an object related to the business entity within the video stream or image. The indicator may take various forms, such as display of a tag, a highlighted area, a hot-spot or the like. In specific embodiments, the indicator is a selectable indicator, such that a user may select (e.g., click-on, hover-over, touch the display, provide a voice command or the like) the indicator to provide display of specifics related stock or investments in the business. The stock investment information may include, but is not limited to, the current price of the stock, the current investment in the business by the user and/or individuals associated with the user or notable investors, annual reports, information on the business/corporation, information filed with a government entity (such as the Securities and Exchange Commission form 10-K or the like). The privately held investment information may include, but is not limited to, details about which venture capital, hedge fund or other entities that have invested in the business/company, company information and the like.

Additionally, the presented investment-related information may provide access to a network entity, such as a financial institution web site, for conducting an investment transaction related to the business entity, for example buying or selling stock in the business entity. Further, the presented investment-related information indicator may provide access to a live chat session with a stock broker or the like to further discuss specifics concerning the business entity or conduct an investment transaction on behalf of the user.

The systems, methods, computer program products, etc. described herein, may be utilized or combined with any other suitable related application. Non-limiting examples of other suitable related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

Thus, methods, systems, computer programs and the like have been disclosed that provide for presenting investment-related information in conjunction with display of a live video stream that includes the related publicly traded or privately held business entity or an object (such as a logo, product or the like) associated with the business entity. Business entities or the objects associated with the business entities that are proximate to a mobile communication device may be identified via object recognition techniques, product codes, wireless communication, location determination or the like. Once the business entities or objects have been identified, the related investment information is retrieved and indicators are displayed in the live video stream proximate to the display of the business entity or an object associated with the business entity. The user can activate the indicator to receive further investment-related information or be connected to an online investment broker for the purpose of purchase stock or some other form of investment instrument associated with the business entity.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing investment-related information to a user on a mobile communication device, the method comprising:
   capturing, by the mobile communication device, images of a business entity or an object associated with the business entity;
   determining, by a computing device processor implementing object recognition processing, that one or more of the captured images identify the business entity, wherein object recognition processing provides for identifying the business entity in an image based on pattern recognition that compares the one or more images to stored markers associated with the business entity;
   determining, by a computing device processor, that the business entity is a predetermined user-specified (1) business or (2) business type; and
   in response to determining that the business entity is one of the predetermined user-specified (1) business or (2) business type,
      retrieving, by a computing device processor, investment-related information associated with the identified business entity, and
      presenting, within a display of a live video stream on the mobile communication device, an investment-related information indicator, wherein the indicator (1) creates browse-able reality browsing by providing user-access to the investment-related information and (2) highlights or superimposes the display of either the business entity or the object associated with the business entity.

2. The method of claim 1, further comprising capturing, by a computing device processor, a code located on or proximate to the business entity or the object and wherein determining further comprises reading, by a computing device processor, the code to assist in identifying the business entity.

3. The method of claim 1, further comprising receiving, at the mobile communication device, wireless communication from the business entity, the object or a tag associated with the business entity or object, wherein the wireless communication assists in identifying the business entity.

4. The method of claim 1, wherein identifying further comprising determining, by a computing device processor, a location of the mobile communication device and determining, via a communication device processor, the business entity based at least in part on the determined location.

5. The method of claim 1, wherein retrieving further comprises retrieving, by the computing device processor, the investment-related information, wherein the investment-related information includes a real-time stock price quote for the business entity.

6. The method of claim 1, wherein retrieving further comprises retrieving, by the computing device processor, the investment-related information, wherein the investment-related information includes one or more of government filing data, investor presentations, competitor performance comparison data, stock trend data, stock trade history data, or news-related data.

7. The method of claim 1, wherein retrieving further comprises retrieving, by the computing device processor, the investment-related information, wherein the investment-related information includes a selectable link to a network entity configured to provide the user an ability to purchase stock in the business entity.

8. The method of claim 1, wherein retrieving further comprises retrieving, by the computing device processor, the investment-related information, wherein the investment-related information is further defined as user-configurable investment-related information.

9. The method of claim 1, wherein retrieving further comprises retrieving, by the computing device processor, the investment-related information, wherein the investment-related information includes identification of one or more individuals associated with the user of the mobile communication device that invests in the business entity.

10. The method of claim 1, further comprising communicating, by the mobile communication device, a user alert that is configured to notify the user of the mobile communication device of the investment-related information.

11. The method of claim 10, wherein communicating further comprises communicating, by the mobile communication device, the user alert, wherein the user alert is user-configured based on one or more of business entity type, business entity performance or identity of business entity investors.

12. The method of claim 1, further comprising receiving, at the mobile communication device, a user input that activates the indicator for display of the investment-related information.

13. The method of claim 12, wherein receiving further comprises receiving, at the mobile communication device, the user input that activates the indicator to access an investment transaction website.

14. The method of claim 12, wherein receiving further comprises receiving, at the mobile communication device, the user input that activates the indicator to initiate one of a voice, video or text chat with an investment analyst.

15. An apparatus for providing investment-related information, the apparatus comprising:
   a mobile communication device including a computing platform having a memory, at least one processor in communication with the memory and an image capturing device in communication with the processor;

a business entity identification application stored in the memory, executable by the processor and the image capturing device and configured to capture images of a business entity or an object associated with the business entity and determine, by implementing object recognition processing, that one or more of the captured images identify the business entity, wherein object recognition processing provides for identifying the business entity in an image based on pattern recognition that compares the one or more images to stored markers associated with the business entity;

an investment-related information retrieval application stored in the memory, executable by the first processor and configured to determine that the business entity is a predetermined user-specified (1) business or (2) business type and, in response to determining that the business entity is one of the predetermined user-specified (1) business or (2) business type, retrieve investment-related information associated with the identified business entities; and an investment-related information presentation application stored in the memory, executable by the processor and configured to, in response to determining that the business entity is one of the predetermined user-specified (1) business or (2) business type, present, within a display of a live video stream on the mobile communication device, at least one investment-related information indicator, wherein the indicator (1) creates browse-able reality browsing by providing user-access to the investment-related information and (2) highlights or superimposes the display of either one of the business entities or one of the objects associated with a business entity.

16. The apparatus of claim 15, wherein the business entity identification application is further configured to assist in identifying the business entities and the objects based on captured images of a code located on or proximate to the business entity or the object and reading the code to identify the business entity.

17. The apparatus of claim 15, wherein the business entity identification application is further configured to assist in identifying the business entities and objects based on receipt of wireless communication from the business entity, the object or a tag associated with the business entity or object.

18. The apparatus of claim 15, wherein the business entity identification application is further configured to assist in identifying the business entities and objects based on a determined location of the mobile communication device.

19. The apparatus of claim 15, wherein the investment-related information retrieval application is further configured to retrieve the investment-related information, wherein the investment-related information includes a real-time stock price quote for the business entity.

20. The apparatus of claim 15, wherein the investment-related information retrieval application is further configured to retrieve the investment-related information, wherein the investment-related information includes one or more of government filing data, investor presentations, competitor performance comparison data, stock trend data, stock trade history data, or news-related data.

21. The apparatus of claim 15, wherein the investment-related information retrieval application is further configured to retrieve the investment-related information, wherein the investment-related information includes a selectable link to a network entity configured to provide a user an ability to purchase stock in the business entity.

22. The apparatus of claim 15, wherein the investment-related information retrieval application is further configured to retrieve the investment-related information, wherein the investment-related information is further defined as user-configurable investment-related information.

23. The apparatus of claim 15, wherein the investment-related information retrieval application is further configured to retrieve the investment-related information, wherein the investment-related information includes identification of one or more individuals associated with a user of the mobile communication device that invests in the business entity.

24. The apparatus of claim 15, wherein the investment-related information presentation application is further configured to communicate a user alert that is configured to notify a user of the mobile communication device of the investment-related information.

25. The apparatus of claim 24, wherein the investment-related information presentation application is further configured to communicate the user alert, wherein the user alert is user-configured based on one or more of business entity type, business entity performance or identity of business entity investors.

26. The apparatus of claim 15, wherein the investment-related information presentation application is further configured to receive a user input that activates the indicator for display of the investment-related information.

27. The apparatus of claim 26, wherein the investment-related information presentation application is further configured to receive the user input that activates the indicator to access an investment transaction website.

28. The apparatus of claim 26, wherein the investment-related information presentation application is further configured to receive the user input that activates the indicator to initiate one of a voice, video or text chat with an investment analyst.

29. A computer program product, the computer program product comprising a non-transitory computer-readable medium having computer-executable instructions to cause a computer to implement the steps of:

capturing, by a mobile communication device, images of a business entity or an object associated with the business entity;

implementing object recognition processing to determine that one or more of the captured images identify the business entity, wherein object recognition processing provides for identifying the business entity in an image based on pattern recognition that compares the one or more images to stored markers associated with the business entity;

determining, by a computing device processor, that the business entity is a predetermined user-specified (1) business or (2) business type; and in response to determining that the business entity is one of the predetermined user-specified (1) business or (2) business type, retrieving investment-related information associated with the identified business entity, and presenting, within a display of a live video stream on the mobile communication device, an investment-related information indicator, wherein the indicator (1) creates browse-able reality browsing by providing user-access to the investment-related information and (2) highlights or superimposes the display of either the business entity or the object associated with the business entity.

30. The computer program product of claim 29, wherein the step of capturing images further comprises capturing, by the mobile communication device, a code located on or proximate to the business entity or the object and reading, via a computing device processor, the code to assist in identifying the business entity.

31. The computer program product of claim 29, wherein the steps further comprise receiving, at the mobile communication device, wireless communication from the business entity, the object or a tag associated with the business entity or object, wherein the wireless communication assists in identifying the business entity.

32. The computer program product of claim 29, wherein the steps further comprise determining a location of the mobile communication device and determining the business entity based at least in part on the determined location.

33. The computer program product of claim 29, wherein the step of retrieving further comprises retrieving the investment-related information, wherein the investment-related information includes a real-time stock price quote for the business entity.

34. The computer program product of claim 29, wherein the step of retrieving further comprises retrieving the investment-related information, wherein the investment-related information includes one or more of government filing data, investor presentations, competitor performance comparison data, stock trend data, stock trade history data, or news-related data.

35. The computer program product of claim 29, wherein the step of retrieving further comprises retrieving the investment-related information, wherein the investment-related information includes a selectable link to a network entity configured to provide a user an ability to purchase stock in the business entity.

36. The computer program product of claim 29, wherein the step of retrieving further comprises retrieving the investment-related information, wherein the investment-related information is further defined as user-configurable investment-related information.

37. The computer program product of claim 29, wherein the step of retrieving further comprises retrieving the investment-related information, wherein the investment-related information includes identification of one or more individuals associated with a user of the mobile communication device that invests in the business entity.

38. The computer program product of claim 29, wherein the computer-executable instructions cause a computer to further implement the step communicating a user alert that is configured to notify a user of the mobile communication device of the investment-related information.

39. The computer program product of claim 38, wherein the step of communicating further comprises communicating the user alert, wherein the user alert is user-configured based on one or more of business entity type, business entity performance or identity of business entity investors.

40. The computer program product of claim 29, wherein the computer-executable instructions cause a computer to further implement the step of receiving a user input that activates the indicator for display of the investment-related information.

41. The computer program product of claim 40, wherein the step of receiving further comprises receiving the user input that activates the indicator to access an investment transaction website.

42. The computer program product of claim 40, wherein the step of receiving further comprises receiving the user input that activates the indicator to initiate one of a voice, video or text chat with an investment analyst.

* * * * *